(12) United States Patent
Swanson

(10) Patent No.: US 7,152,539 B2
(45) Date of Patent: Dec. 26, 2006

(54) FERTILIZER INJECTOR WING FOR DISC OPENERS

(75) Inventor: Guy J. Swanson, Spokane, WA (US)

(73) Assignee: Exactrix LLC, Spokane, WA (US)

( * ) Notice: Subject to any disclaimer, the term of this patent is extended or adjusted under 35 U.S.C. 154(b) by 0 days.

(21) Appl. No.: 11/306,912

(22) Filed: Jan. 16, 2006

(65) Prior Publication Data

US 2006/0102058 A1    May 18, 2006

Related U.S. Application Data

(63) Continuation-in-part of application No. 10/659,564, filed on Sep. 9, 2003, now Pat. No. 7,004,090.

(51) Int. Cl.
*A01C 23/00* (2006.01)

(52) U.S. Cl. ............... 111/119; 111/122; 111/123; 111/167; 111/188

(58) Field of Classification Search ........ 111/118–129, 111/149, 157, 163–170, 186–188
See application file for complete search history.

(56) References Cited

U.S. PATENT DOCUMENTS 5,140,917 A * 8/1992 Swanson ............... 111/187
6,453,832 B1 * 9/2002 Schaffert ............... 111/150

* cited by examiner

*Primary Examiner*—Christopher J. Novosad
(74) *Attorney, Agent, or Firm*—Hovey Williams LLP

(57) ABSTRACT

Disc openers (14) for use with an air seeder (10) are configured for seeding and fertilizing a field (G). The opener (14b) broadly includes a coulter disc (20), a seed boot (24), and a fertilizer injector wing (26). The fertilizer injector wing (26) is configured for fixed attachment to the seed boot (24) and broadly includes a body (48), including an angled outboard portion (56), a toxic fertilizer injector (50), and a non-toxic fertilizer injector (52). The opener (14b) with the fertilizer injector wing (26) is configured to place the seed row (S) and the dedicated fertilizer band (DB) at an optimum geometric positional alignment relative to the seed row (S), in a single, low soil disturbing planting pass without disrupting the seed bed (BS). In alternative wings (300 and 400), the sufficiently safe geometric positioning is accomplished by the force of delivery of the fertilizers (N and P) coupled with an offset angle (OA) defined between a fertilizer injection axis (AF) and a seed outlet axis (AO).

35 Claims, 11 Drawing Sheets

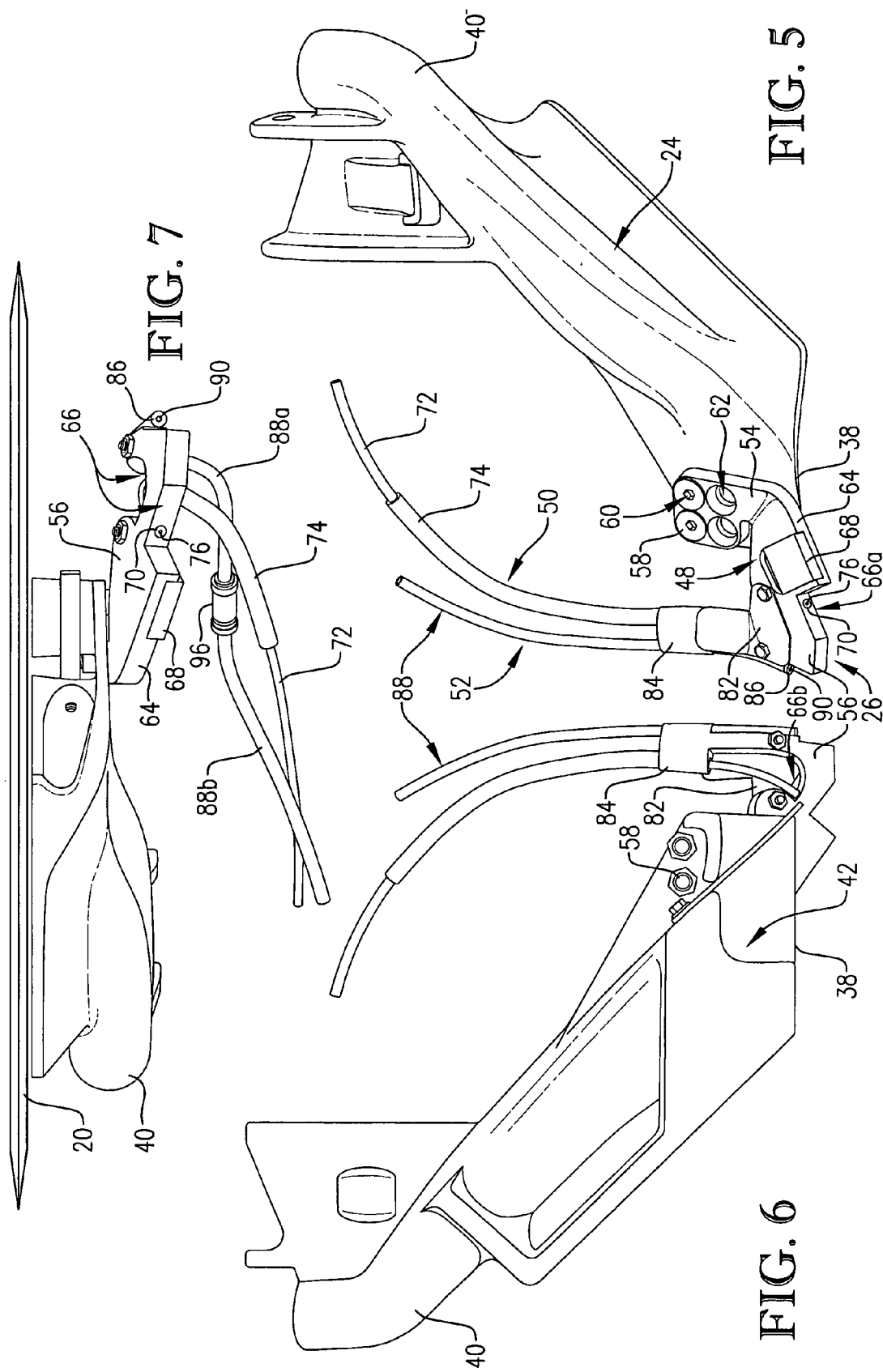

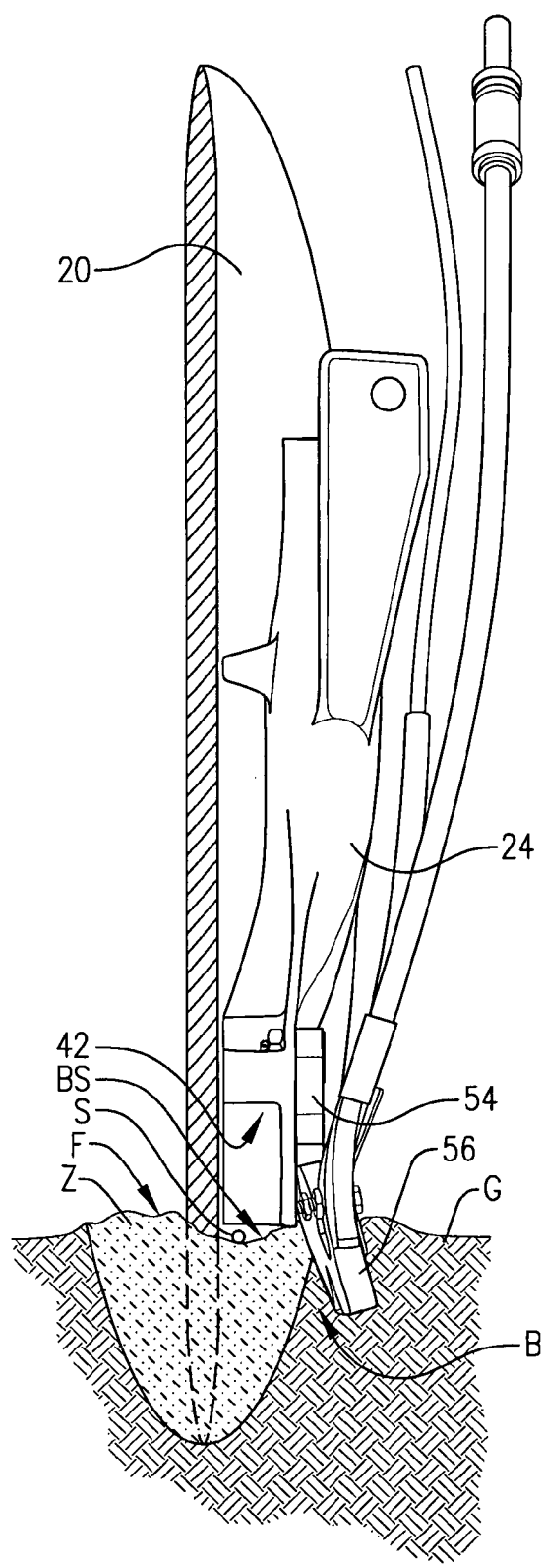
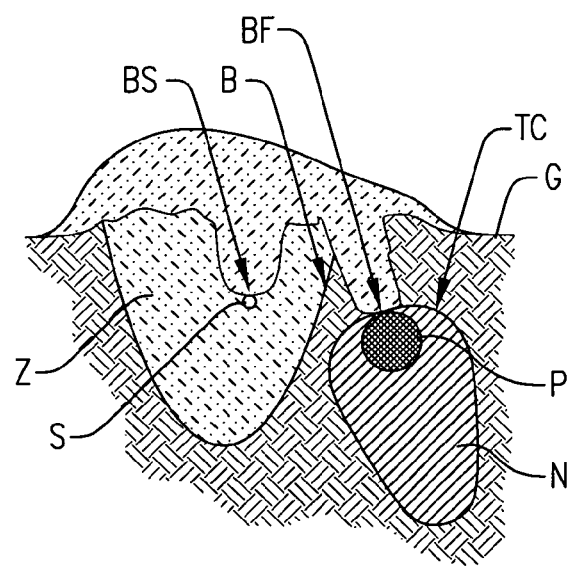
FIG. 8
FIG. 9

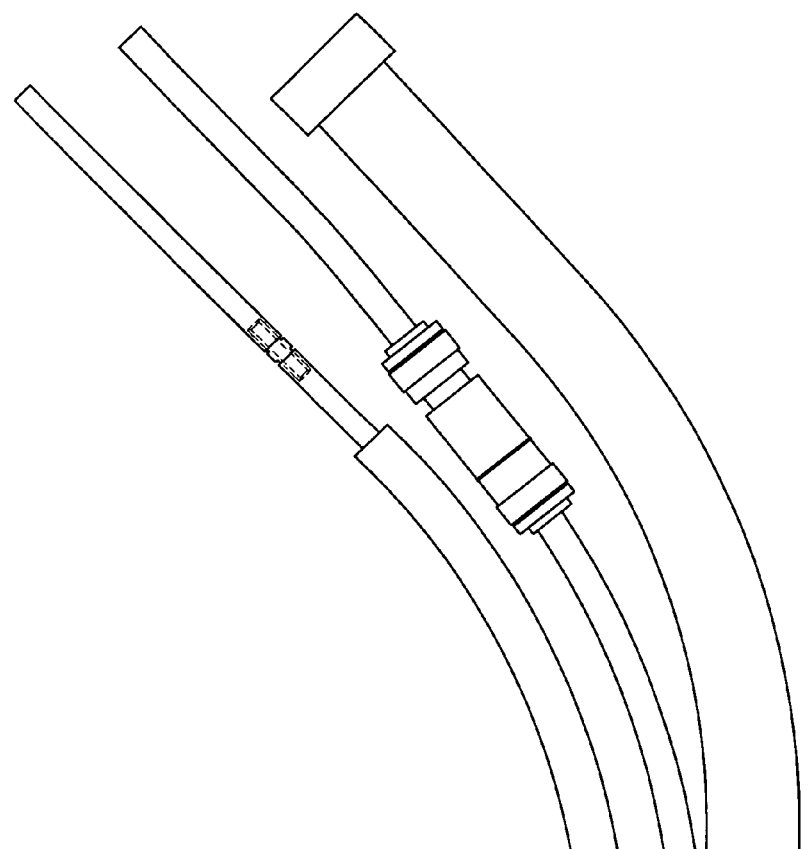
FIG. 12
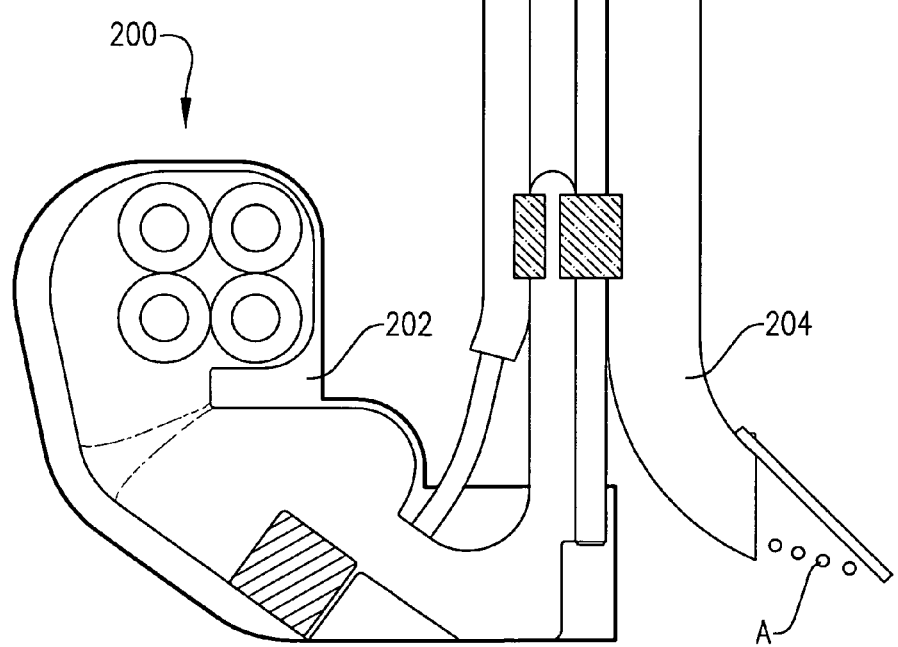

FERTILIZER INJECTOR WING FOR DISC OPENERS

RELATED APPLICATIONS

This application is a continuation-in-part of application Ser. No. 10/659,564, filed Sep. 9, 2003, now U.S. Pat. No. 7,004,090 which is hereby incorporated by reference herein.

BACKGROUND OF THE INVENTION

1. Field of the Invention

The present invention relates generally to a method and apparatus for placement of fertilizer and seed during planting of an agricultural crop. More specifically, the present invention concerns a fertilizer injector wing that affixes to a seed boot of a low disturbance disc opener and a method of using the winged opener to place a seed row and a dedicated band of fertilizer at an optimum geometric positional alignment relative to the seed row. The inventive wing and method of use enables a toxic charge of fertilizer (e.g., a charge containing the entire nutrient package to sustain season long growth) to be placed in close proximity with the seed row in a single, relatively high speed, low soil disturbing planting pass of relatively simple, durable equipment without damaging the germination of the seed or disrupting the seed bed.

2. Discussion of Prior Art

Farmers are increasingly utilizing no-tillage planting techniques to produce all types of crops. No-till planting typically utilizes a rotatable disc opener, or drill, that fractures the soil into a furrow thereby creating a disturbed soil zone wherein a seed bed can be formed for seed placement therein, prior to closing the furrow. The disc opener is designed to minimize the soil disturbance leaving the stubble, or organic matter, from the previous crop standing in the field, which in turn reduces water runoff in the field, thereby greatly reducing erosion of the top soil. The furrow opening, seed bed formation, seed placement, and furrow closing are typically done in a single pass with a disc opener that includes a rotatable disc, a seed boot, and a closing wheel. Prior art low disturbance disc openers are well known in the art and are available from most OEMs. One exemplary no-till disc opener is the John Deere 1890 No-Till Air Drill.

While no-till farming greatly reduces the escape of $CO_2$ by reducing the mineralization of the organic matter in the soil, it also undesirably prevents the release of organic nitrogen into the soil, which is needed by the new seedlings in order to grow. It is known in the art to add an ammoniacal fertilizer to the soil, either with a pre-planting application of fertilizer or applying fertilizer at the time of planting, in order to enhance the yield of the produced crop. The most prevalent ammoniacal fertilizer utilized is anhydrous ammonia, however, it is known to use other ammoniacal fertilizers including aqua ammonia, ammoniac based liquified urea, and other ammoniac based solutions such as Solution 32 (32-O-O), Solution 28 (28-O-O), etc. It is also known to add other, less toxic fertilizers to the soil as well as other control agents, in addition to the ammoniacal fertilizer such as ammoniated phosphate (e.g., 10-34-O, etc.), potassium, sulfur, mustard meal, etc. These fertilizers and agents can be dual placed with the ammoniacal fertilizer, through processes known as double or triple shooting, or can be independently placed after the ammoniacal fertilizer is placed.

Prior art no-till fertilizer placement methods include top dressing the fertilizer and banding the fertilizer. Top dressing, or broadcasting, typically sprays the fertilizer on top of the field prior to planting or over the crop after the seedlings have sufficiently grown above the surface. However, top dressing does not involve placing the fertilizer in the top soil. Banding the fertilizer involves placing the fertilizer in a specified location in the ground either prior to planting, during the planting process, or after the seedlings have sufficiently grown above the surface. Prior art banding methods include mid-row banding, paired row banding, and cross row feeding. Mid-row banding requires an additional opener, dedicated to the fertilizer, to open a furrow between two seed rows, where the fertilizer is placed. Seed rows must be typically spaced ten inches a part, with the mid-row band being five inches from each seed row. An exemplary mid-row banding opener is the John Deere 1895 Separate Fertilizer Placement Tool. Paired row banding also requires an additional, dedicated opener to create a separate furrow for the fertilizer, however, a pair of seed rows are spaced closer together, for example, five inches apart, with the fertilizer band placed between the paired row, and adjacent groups of paired rows are further spaced, for example fifteen inches apart. In cross row feeding, a deep band of fertilizer (e.g., six inches below the surface) is placed beneath each seed row and the seed rows are placed close together, for example three and one-half inches apart. In order to obtain the deep banding, cross row feeding requires either a dedicated opener for the deeper fertilizer furrow or a knife positioned behind the opener disc for placing the fertilizer deeper than the seed row. An exemplary cross row feeding opener is disclosed in U.S. Pat. No. 5,140,917 (the "Swanson '917 patent") issued to the inventor of the current application and incorporated herein by reference. Although not technically considered banding, it is also known to place non-toxic amounts of popup fertilizer in the seed row during planting and then subsequently place the toxic charge in the soil after the seedling has sufficiently grown, for example, by side dressing. One exemplary device to place popup fertilizer in the seed row is disclosed in U.S. Pat. No. 6,453,832.

These prior art no-till fertilizing methods are problematic and subject to several limitations. For example, with both mid-row banding and paired row banding, each fertilizer row must be shared by at least two seed rows thereby reducing the effectiveness of the fertilizer available to any one row and thus undesirably diminishing the yield. Mid-row banding is further problematic in that the fertilizer must be remotely placed from the seed rows thereby undesirably allowing weeds exposed along the fertilizer furrow better access to the band than the remote seed rows. These problems were identified and discussed in the Swanson '917 patent previously incorporated herein. Although cross row feeding was an advance in the art and solved many of the problems discussed above, cross row feeding, like all of the prior art banding methods, require separate openers, or deep running knives, to cut the opening for the fertilizer bands. This additional cutting equipment is undesirable for several reasons, including increased purchase and maintenance costs, increased horsepower requirements to pull the cutting equipment, and increased weed-activating and erosive soil disturbance. Furthermore, excessive soil disturbance is undesirable because it exposes moisture rich top soil to the atmosphere thereby allowing the moisture to be lost and thus unavailable to the germinating seed. Moreover, it has been determined that, when deeply placed, the toxic ammoniacal charge undesirably migrates with wetting front line and undesirably away from the germinating seed roots. Placement of popup fertilizer in the seed row is problematic as it requires at least two equipment passes through the field and undesirably prevents the seeds access to the toxic charge of fertilizer during the critical germination stage thereby limiting yield. Accordingly, there is a need for an apparatus and/or method of planting that allows producers to place a dedicated toxic charge of ammoniacal nitrogen and phosphate in the soil during planting at an optimum position relative to the seed row using efficient equipment that does not disturb the soil seed bed or create excessive soil disturbance.

SUMMARY OF THE INVENTION

The present invention provides a unique fertilizer injector wing that affixes to a seed boot of a low disturbance disc opener that enables an improved method of placing a seed row with a dedicated band of fertilizer at an optimum geometric positional alignment relative to the seed row. The inventive wing and method of use enables a toxic charge of fertilizer (e.g., a charge containing the entire nutrient package to sustain season long growth) to be placed in close proximity with the seed row in a single, low soil disturbing planting pass without damaging the germination of the seed or disrupting the seed bed. The inventive wing enables a relatively simple, yet durable low disturbance opener capable of relatively high speed use. The inventive dedicated band placement reduces weed growth and moisture loss and enables better crop yield with less fertilizer requirements resulting in decreased expense and reduced polluting of the environment with nitrogen.

A first aspect of the present invention concerns a furrow opener broadly including a rotatable disc operable to be pulled in a forward direction to thereby open a furrow, a seed boot fixed relative to one side of the disc and being operable to insert seed in the furrow, and a fertilizer injector wing fixed to the seed boot and being operable to form a fertilizer bed and inject fertilizer therein. The seed boot presents an outboard side distally spaced from the disc. The fertilizer injector wing is positioned adjacent the outboard side of the seed boot so that the seed boot is positioned between the disc and wing. The fertilizer injector wing includes an outboard portion positioned below the outboard side of the seed boot and angling away therefrom.

A second aspect of the present invention concerns a method of simultaneously applying a toxic charge of ammoniacal fertilizer in close proximity with seed. The method broadly includes the steps of (a) fixing a seed boot relative to a rotatable disc and positioning the boot on one side thereof, (b) fixing a fertilizer injector wing to the seed boot and laterally spacing the wing from the boot so that the seed boot is positioned between said disc and wing, (c) pulling the disc through the soil to thereby open an elongated furrow wherein said disc creates a zone of disturbed soil in the furrow, (d) pulling the seed boot and injector wing through the furrow to form a seed bed within the disturbed soil zone and to simultaneously form a fertilizer bed in communication with the furrow and spaced to one side of the seed bed so that a berm is formed between the seed and fertilizer beds, (e) placing seed along the seed bed, and (f) placing ammoniacal fertilizer along the fertilizer bed.

A third aspect of the present invention concerns a fertilizer injector wing for use with a furrow opener wherein the furrow opener includes a disc that rotates in a forward direction to open a furrow and a seed boot that forms a seed bed in the furrow and inserts seed therein. The injector wing broadly includes an inline portion operable to engage the seed boot and presenting a generally linear axis of orientation, an outboard portion positioned below the inline portion and angling away therefrom, a leading edge at least partially disposed along the outboard portion and being configured to cut a slot in communication with the furrow adjacent the seed bed, and a terminal orifice in a linearly aligned trailing relationship with the leading edge and being configured to inject an ammoniacal fertilizer into the slot. The axis of orientation is generally parallel to vertical when the inline portion engages the seed boot. The terminal orifice is spaced below and laterally spaced from the inline portion.

A fourth aspect of the present invention concerns a furrow opener broadly including a rotatable disc operable to be pulled over ground in a forward direction to thereby open a furrow therein, a seed boot fixed relative to one side of the disc and being operable to insert seed in the furrow, and a fertilizer injector wing fixed to the seed boot. The seed boot presents an outboard side distally spaced from the disc. The seed boot includes a seed outlet operable to discharge seed into the furrow. The seed outlet defines an outlet axis extending generally parallel to the direction seed is discharged. The fertilizer injector wing is positioned adjacent the outboard side of the seed boot so that at least a portion of the seed boot is positioned between the disc and wing. The fertilizer injector wing includes at least one nozzle operable to inject fertilizer into the furrow. The at least one nozzle defines an injection axis extending generally parallel to the direction fertilizer is injected. The injection axis extends nonparallel relative to the outlet axis so as to define an offset angle therebetween. The offset angle is between about five and about thirty degrees.

A fifth aspect of the present invention concerns a method of simultaneously applying a toxic charge of ammoniacal fertilizer in close proximity with seed. The method broadly includes the steps of (a) fixing a seed boot relative to a rotatable disc and positioning the boot on one side thereof, (b) fixing a fertilizer injector wing to said seed boot and laterally spacing the wing from the boot so that the seed boot is positioned between said disc and wing, (c) pulling the disc through the soil to thereby open an elongated furrow wherein said disc creates a zone of disturbed soil in the furrow, (d) pulling the seed boot and injector wing through the furrow to form a seed bed within the disturbed soil zone, (e) dropping seed along a seed-placement axis into the seed bed, and (f) simultaneously injecting ammoniacal fertilizer along an injection axis into the furrow outside of the seed bed, wherein the seed-placement and injection axes are offset by an offset angle of between about five and about thirty degrees.

A sixth aspect of the present invention concerns a fertilizer injector wing for use with a furrow opener wherein the furrow opener includes a disc that rotates in a forward direction over ground to open a furrow therein and a seed boot that forms a seed bed in the furrow and inserts seed therein. The injector wing broadly includes a housing operable to engage the seed boot, and a nozzle supported on the housing and being configured to inject an ammoniacal fertilizer into the furrow. The nozzle includes a terminal orifice through which fertilizer is injected into the furrow. The nozzle defines an injection axis extending generally parallel to the direction fertilizer is injected. The injection axis extends nonparallel relative to vertical relative to the ground so as to define an offset angle between the injection axis and vertical. The offset angle is between about five and about thirty degrees.

In a preferred embodiment, the fertilizer injector wing is configured to cut the fertilizer bed in the disturbed soil zone or at the event horizon of the furrow so the fertilizer bed is adjacent and at or slightly below the seed bed. The preferred injector wing injects a toxic charge of liquid anhydrous ammonia and ammoniated phosphate in a single dedicated fertilizer band along the fertilizer bed. All single disc openers can be improved with the injector wing. Toxic plant food materials can be added in close proximity to the radicle and seminal roots as they explore the soil for nutrients. Root cap burning can be avoided by geometrically or positionally locating the plant food to the side and slightly below the seed row. The smaller lateral hair roots proceeding away from the radicle or seminal roots explore the soil horizontally and wander into the dedicated band of placed plant nutrients. The lateral fine hair roots colonize around and through the band of concentrated nutrients while main radicle or the main pair of seminal roots proceed downward in a naturally geotropic response. The positional location of the placed nutrients will not harm the germination of the seed or burn the root cap of the radicle or the root cap of the first pair of seminal roots. The injector wing eliminates the need to add an additional row of mid-row fertilizer banding units to feed two rows of crop seed. The injector wing provides leveraged fertility to each seed row. Therefore the additional cost, maintenance and soil tillage moisture loss is removed from the initial and operational cost of the seeding machine.

In another preferred embodiment, the injector wing does not cut a separate fertilizer bed, but rather injects the toxic fertilizer at an offset angle relative to the seed bed at a sufficient force to geometrically or positionally locate the plant food to the side and slightly below the seed row. In this preferred embodiment, phosphate fertilizer is injected ahead of the toxic fertilizer so that triammonium polyphosphate sulfate crystals are formed in the furrow.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein:

FIG. 5 is an enlarged front perspective view of the seed boot and fertilizer injector wing removed from the disc opener illustrated in FIG. 4;

FIG. 6 is an enlarged rear elevational view of the seed boot and fertilizer injector wing illustrated in FIG. 5;

FIG. 7 is a bottom view of the seed boot and fertilizer injector wing illustrated in FIGS. 5 and 6, rotated one-hundred and eighty degrees and shown with the disc;

FIG. 8 is a perspective view of the disc (shown in section), seed boot, and fertilizer injector wing illustrated in FIG. 7 shown with the disc opening a furrow, the seed boot forming a seed bed in the disturbed soil zone in the furrow and placing a seed therein, and the fertilizer injector wing forming a fertilizer bed in communication with the furrow;

FIG. 9 is view of the furrow similar to FIG. 8 with the opener removed and shown after the fertilizer injector wing has injected the fertilizer band into the fertilizer bed, the firming wheel has pressed the seed into the soil, and the closing wheel has closed the furrow illustrating the geometric positional alignment of the seed and fertilizer beds isolated by the berm;

FIG. 12 is a side elevational view of a right-handed fertilizer injector wing constructed in accordance with a preferred alternative embodiment of the present invention and having a seed guard and control agent delivery tube;

Figure 13:
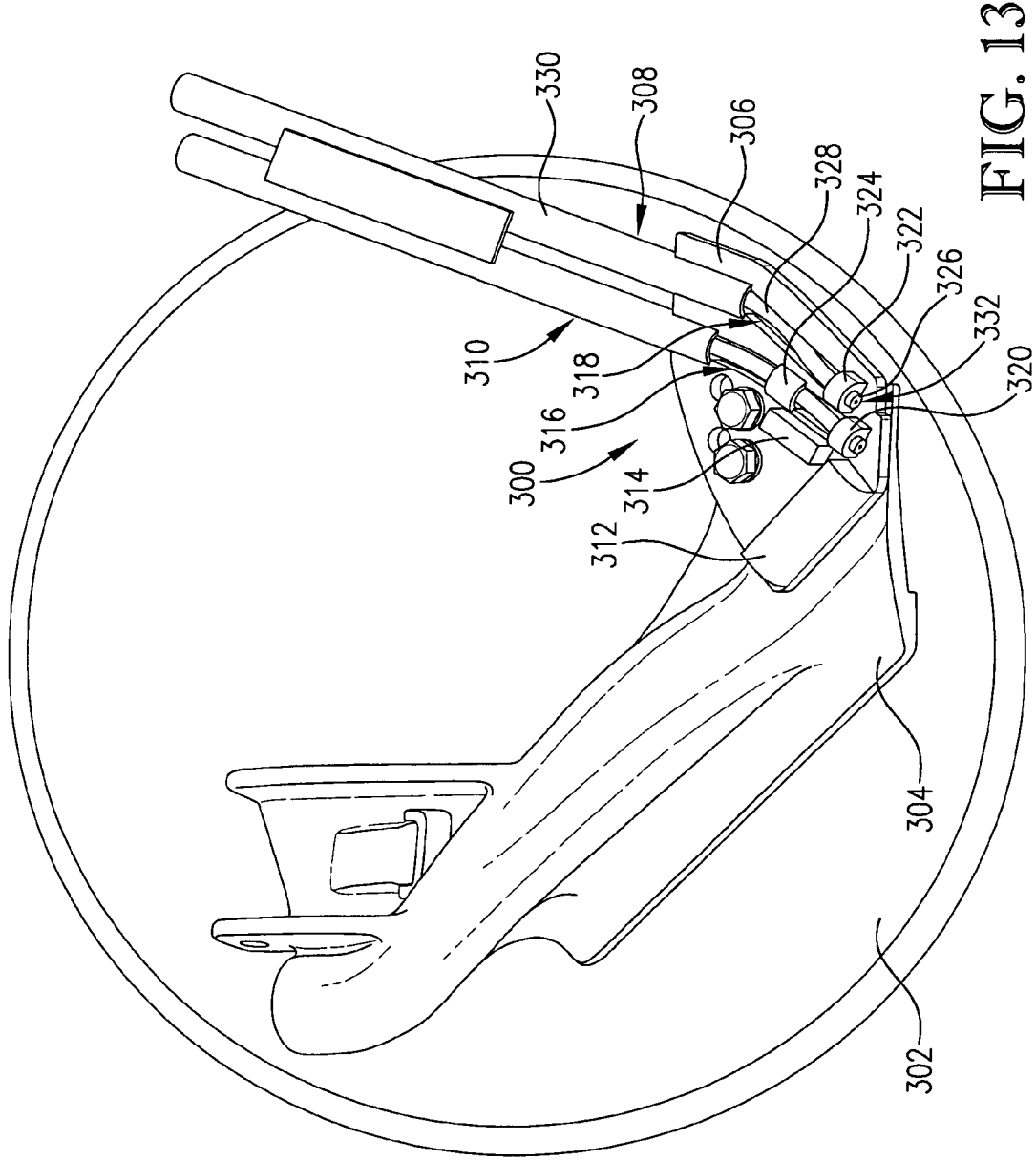
Figure 14:
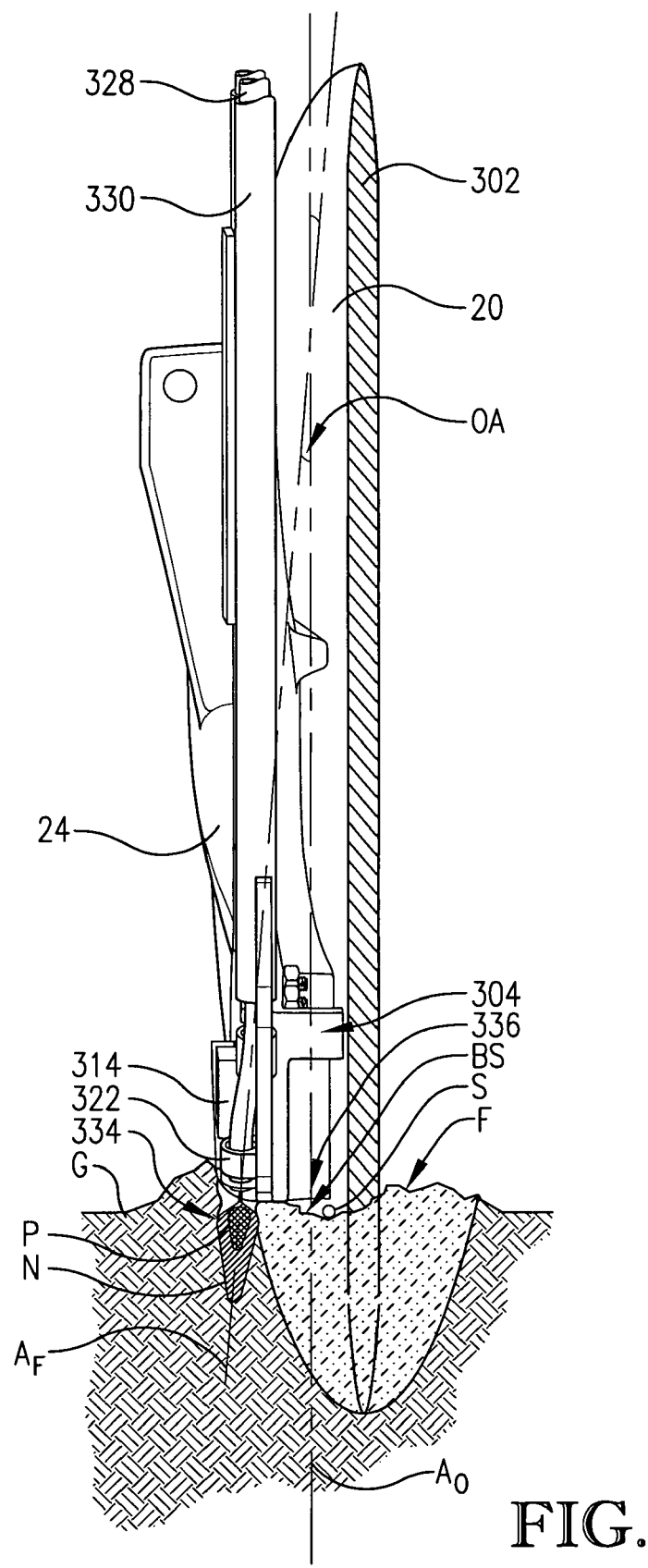
Figure 15:
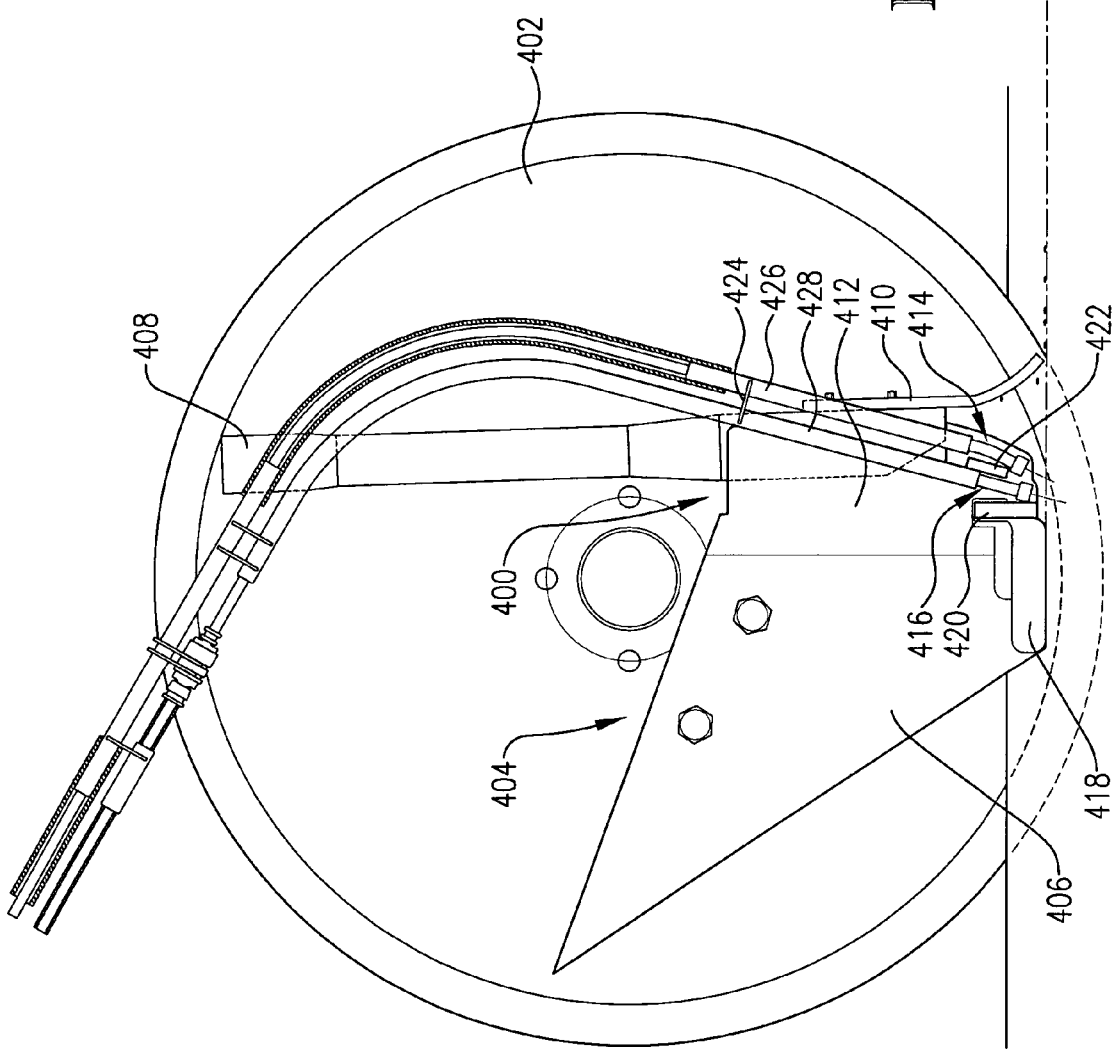
Figure 16:
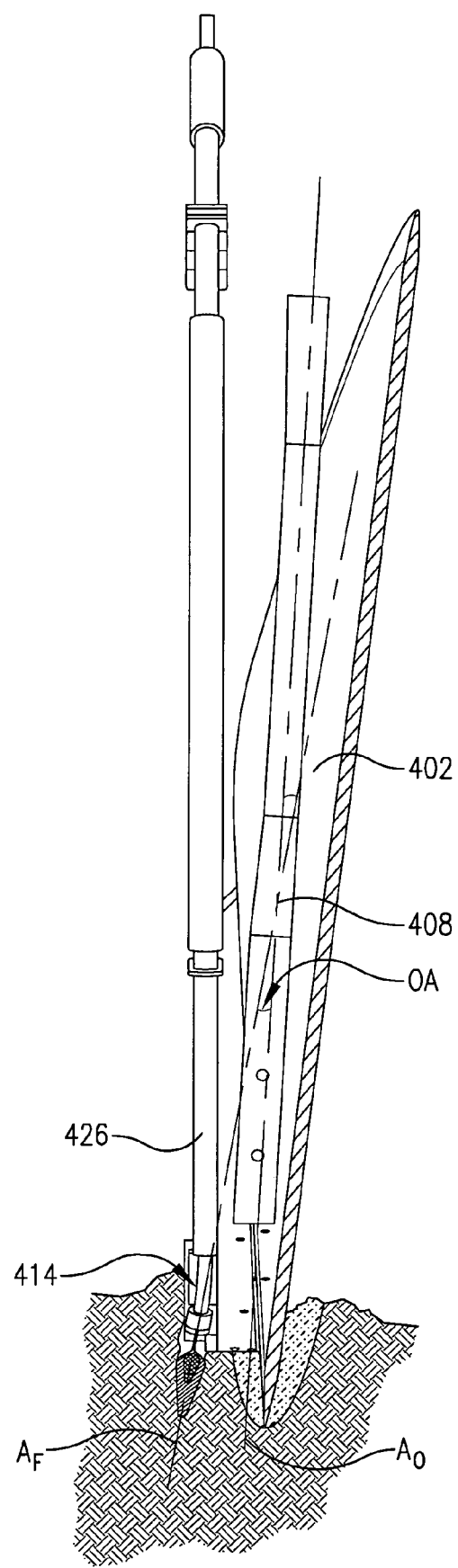

FIG. 13 is a side elevational view of a disc, a seed boot, and a left-handed fertilizer injector wing of a disc opener constructed in accordance with a second preferred alternative embodiment of the present invention and having the non-toxic and trailing toxic fertilizer injector nozzles recessed relative to the lower-most margin of the seed boot and presenting injection axes offset from the seed outlet axis;

FIG. 14 is a is a perspective view of the disc (shown in section), seed boot, and fertilizer injector wing illustrated in FIG. 13 shown with the disc opening a furrow, the seed boot forming a seed bed in the disturbed soil zone in the furrow and placing a seed therein, and the fertilizer injector wing injecting the fertilizer band into the ground illustrating the geometric positional alignment of the seed bed and the fertilizer band isolated therefrom;

FIG. 15 is a side elevational view of a disc, a scraper-and-tube type seed boot, and a left-handed fertilizer injector wing of a disc opener constructed in accordance with a third preferred alternative embodiment of the present invention and having the non-toxic and trailing toxic fertilizer injector nozzles recessed relative to the lower-most margin of the seed boot and presenting injection axes offset from the seed outlet axis;

FIG. 16 is a is a perspective view of the disc (shown in section), seed boot (shown with the seed guard removed), and fertilizer injector wing illustrated in FIG. 15 shown with the disc opening a furrow, the seed boot forming a seed bed in the disturbed soil zone in the furrow and placing a seed therein, and the fertilizer injector wing injecting the fertilizer band into the ground illustrating the geometric positional alignment of the seed bed and the fertilizer band isolated therefrom.

DETAILED DESCRIPTION OF THE PREFERRED EMBODIMENTS

Figure 1:
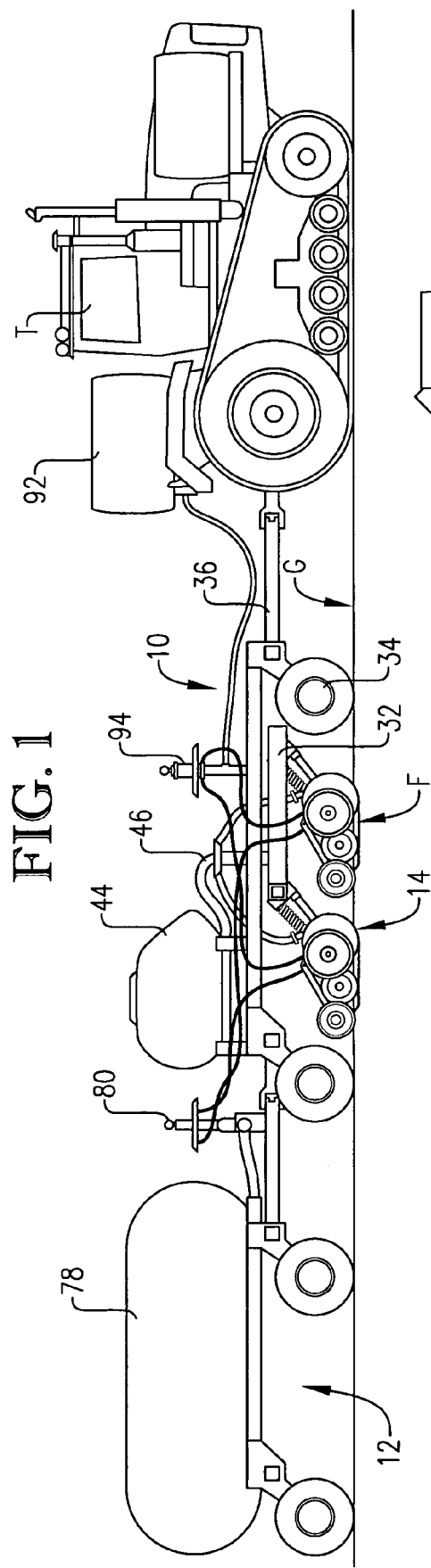
FIG. 1 is a side elevational view of a tractor pulling a two gang air seeder and a tow-behind fertilizer cart, with the seeder including a plurality of single disc openers constructed in accordance with a preferred embodiment of the present invention and each including a fertilizer injector wing coupled to a seed boot.

FIG. 1 illustrates a tractor T pulling an air seeder 10 and a tow-behind fertilizer cart 12 configured for seeding and fertilizing a field G for crop production. The seeder 10 includes a plurality of single disc openers 14 constructed in accordance with the principles of a preferred embodiment of the present invention, with representative right and left disc openers 14a and 14b, respectively, being illustrated in detail in FIGS. 2–11. While the principles of the present invention are particularly well suited for low disturbance, no-tillage single disc applications, these principles could be readily applied to virtually any seeding and/or fertilizer application in which a furrow is opened for in-ground placement of the seed and/or fertilizer. Furthermore, the principles of the present invention are not limited to the production of any particular crop and can readily be adapted to virtually all crops generated by in-ground placement of seed and/or fertilizer. The illustrated opener 14b broadly includes a drawbar assembly 16, a disc assembly 18 including a coulter disc 20 and a gauge wheel 22, a seed boot 24, a fertilizer injector wing 26, a firming wheel assembly 28, and a closing wheel assembly 30.

Figure 3:
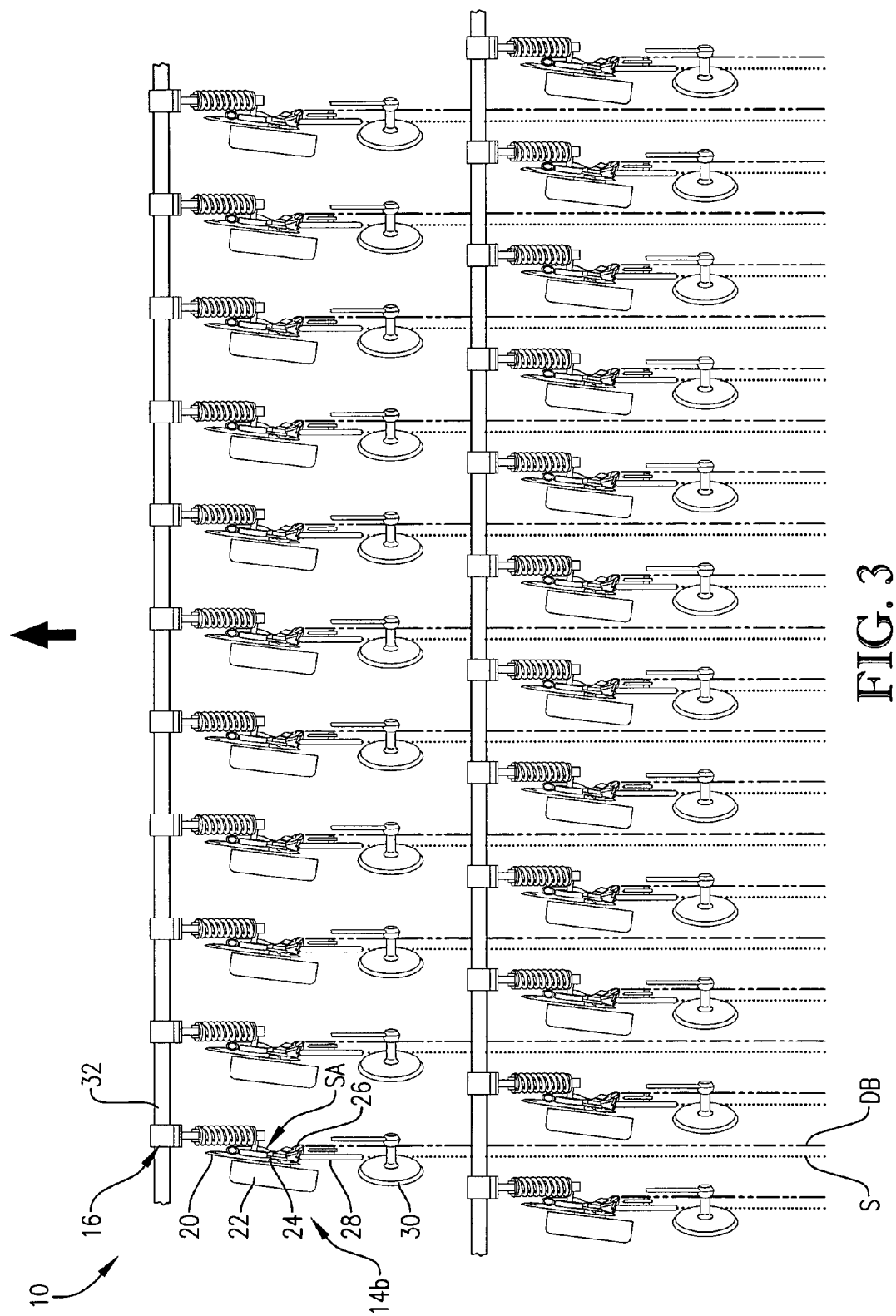
FIG. 3 is a fragmentary plan view of the left side of the seeder illustrated in FIG. 1 schematically showing the placement of the single dedicated bands of fertilizer with each seed row.

Turning initially to FIGS. 1 and 3, the illustrated seeder 10 is a two gang, double winged seeder configured to draw sixty-four openers 14 spaced on seven and one-half inch centers. However, and as will be further described below, the layout of the plurality of openers 14 could be variously configured in any manner known in the art, including any alternative suitable numbers, spacing, and ranking of the openers. In one manner well known in the art, the seeder 10 includes a two gang, winged frame assembly 32 adjustably supported by a plurality of road wheels 34 and coupled to the tractor T by a floating hitch 36. As will become apparent, virtually any conventional seeder could be modified with the inventive openers 14 described in detail below. One exemplary seeder suitable for modification in accordance with a preferred embodiment of the present invention is the No-Till Air Drill available from John Deere as Model No. 1890. However, the seeder 10 could be variously alternatively configured and virtually any commercially available no-till seeder will suffice. It will be appreciated that the seeder 10 could be pulled by any suitable power source known in the art.

Figure 2:
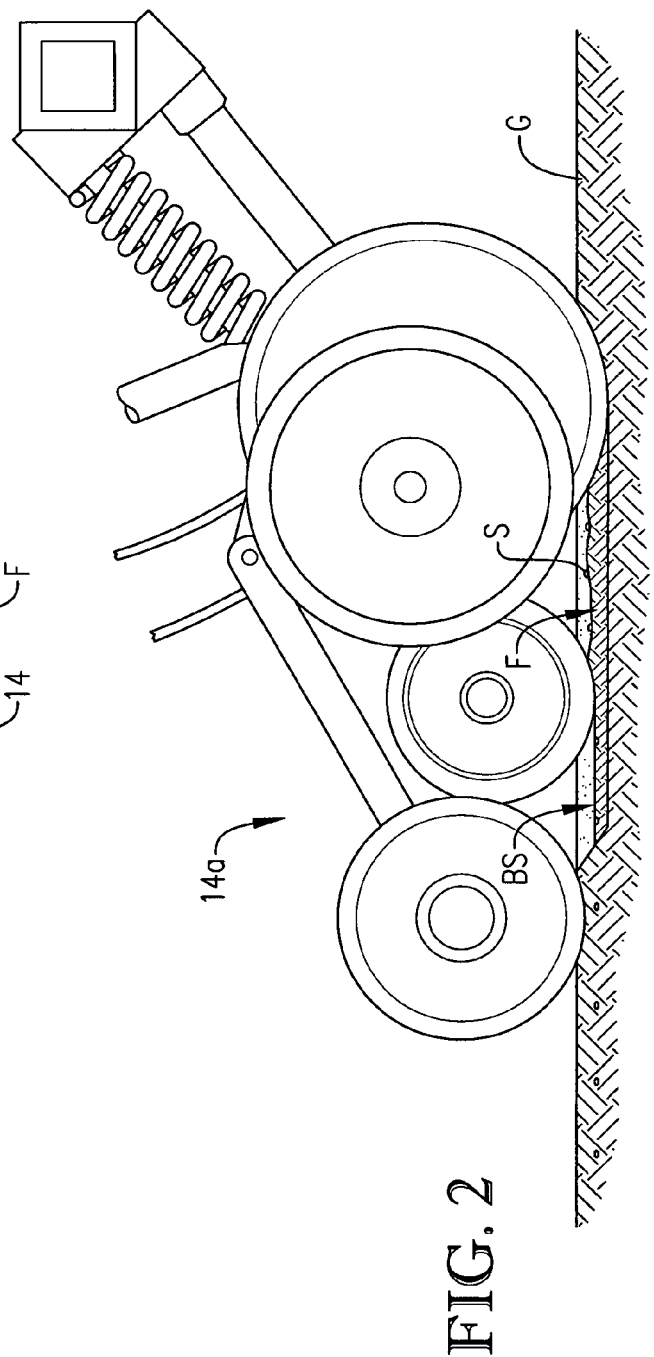
FIG. 2 is an enlarged side elevational view of one of the right-handed disc openers illustrated in FIG. 1 removed from the tool bar of the air seeder.
Figure 10:
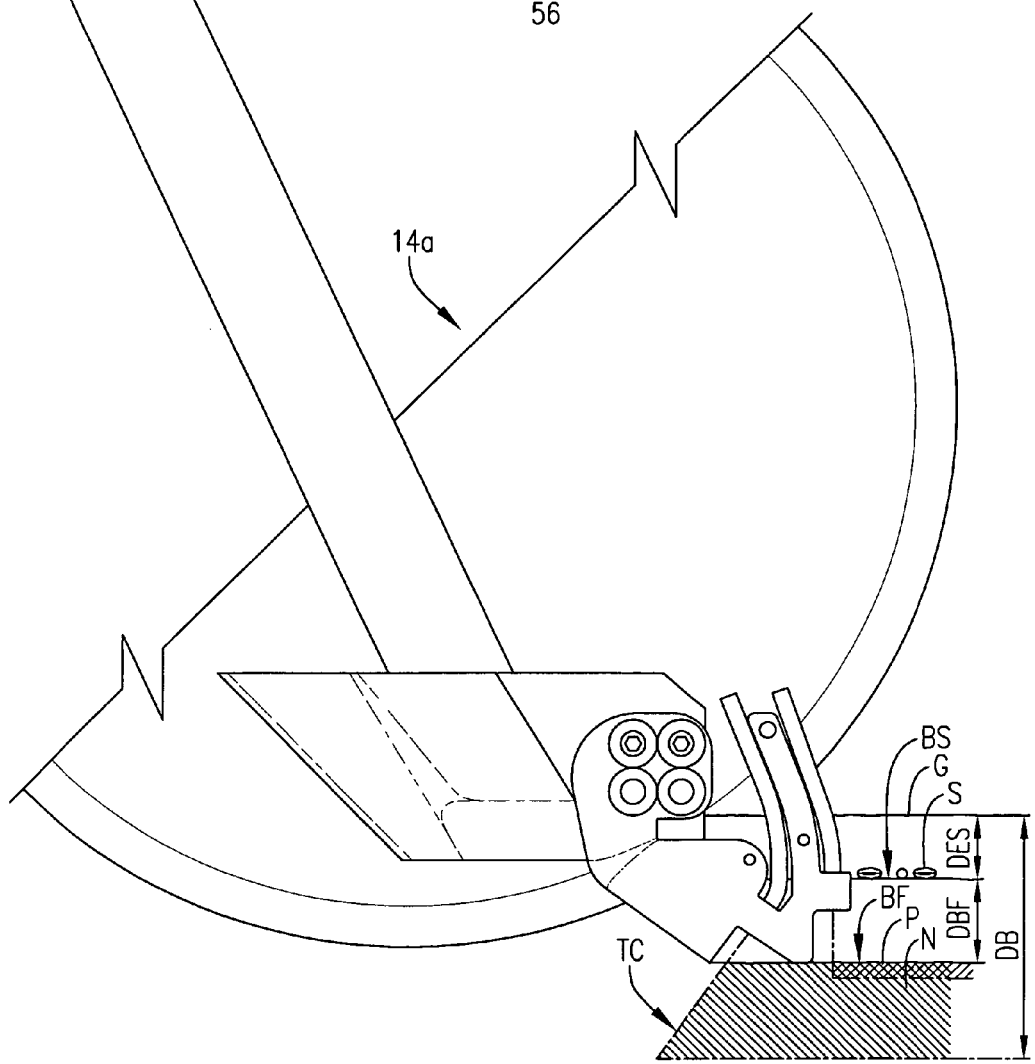
FIG. 10 is a schematic diagram of the right-handed opener illustrated in FIG. 2 showing the vertical depth spacing of the seed bed and fertilizer bed formed by the opener.

Turning now to FIGS. 2–11, the representative right opener 14a is shown in FIGS. 2 and 10 with the representative left opener 14b being shown in FIGS. 3–9 and 11. The right opener 14a is a mirror image of the left opener 14b, but is otherwise virtually identically configured. Accordingly, only the left opener 14b will be described in detail with the understanding that the other openers 14, left and right, are similarly constructed. It will be appreciated that the opener 14b includes several conventional components in one manner well known in the art, including the drawbar assembly 16, the disc assembly 18, the seed boot 24, the firming wheel assembly 28, and the closing wheel assembly 30, therefore, these conventional components will only be briefly described with the understanding that they could be configured in any suitable manner.

The drawbar assembly 16 brackets to one of the toolbars of the frame assembly 32 and thereby pulls the other components of the opener 14b behind the toolbar while yieldably biasing the components downwardly into firm engagement with the ground G. The disc 20 of the disc assembly 18 is rotatably supported (e.g., by an axle, etc.) on the drawbar 16 and engages the ground G when in an operating position, i.e., when the guage wheel 22 engages the ground G. When in the operating position, as the disc 20 is pulled in a forward direction (e.g., left-to-right as viewed in FIG. 1 and in the direction of the arrow as shown in FIG. 3), the disc 20 cuts through the field G thereby fracturing the ground and creating an elongated furrow F therein (see FIGS. 8 and 9). The disc 20 is adjustable relative to the gauge wheel 22 to adjust the depth of the bottom dead center of the disc 20 relative to the surface of the ground G. In this manner, the depth of the furrow F, as controlled by the bottom dead center position of the disc 20, can be adjusted to several different depth settings between zero to deep settings. For example, in the illustrated opener 14b, in a shallow setting, the bottom dead center position may be one and one-half inches below the surface of the ground G and three and one-half inches below the surface G when in a deep setting. As shown in FIGS. 3 and 8, the leading edge of the disc 20 is angled relative to the forward direction of travel preferably being offset therefrom between one and ten degrees, and most preferably about seven degrees offset. In this regard, when the disc 20 opens the furrow F, it creates a zone of disturbed soil Z, as shown in FIGS. 8 and 9, within the furrow F trailing the leading edge of the disc 20. As shown in FIG. 3, the offset orientation of the disc 20 creates a shadow area SA behind the disc 20 as the disc 20 is pulled in the forward direction.

Figure 4:
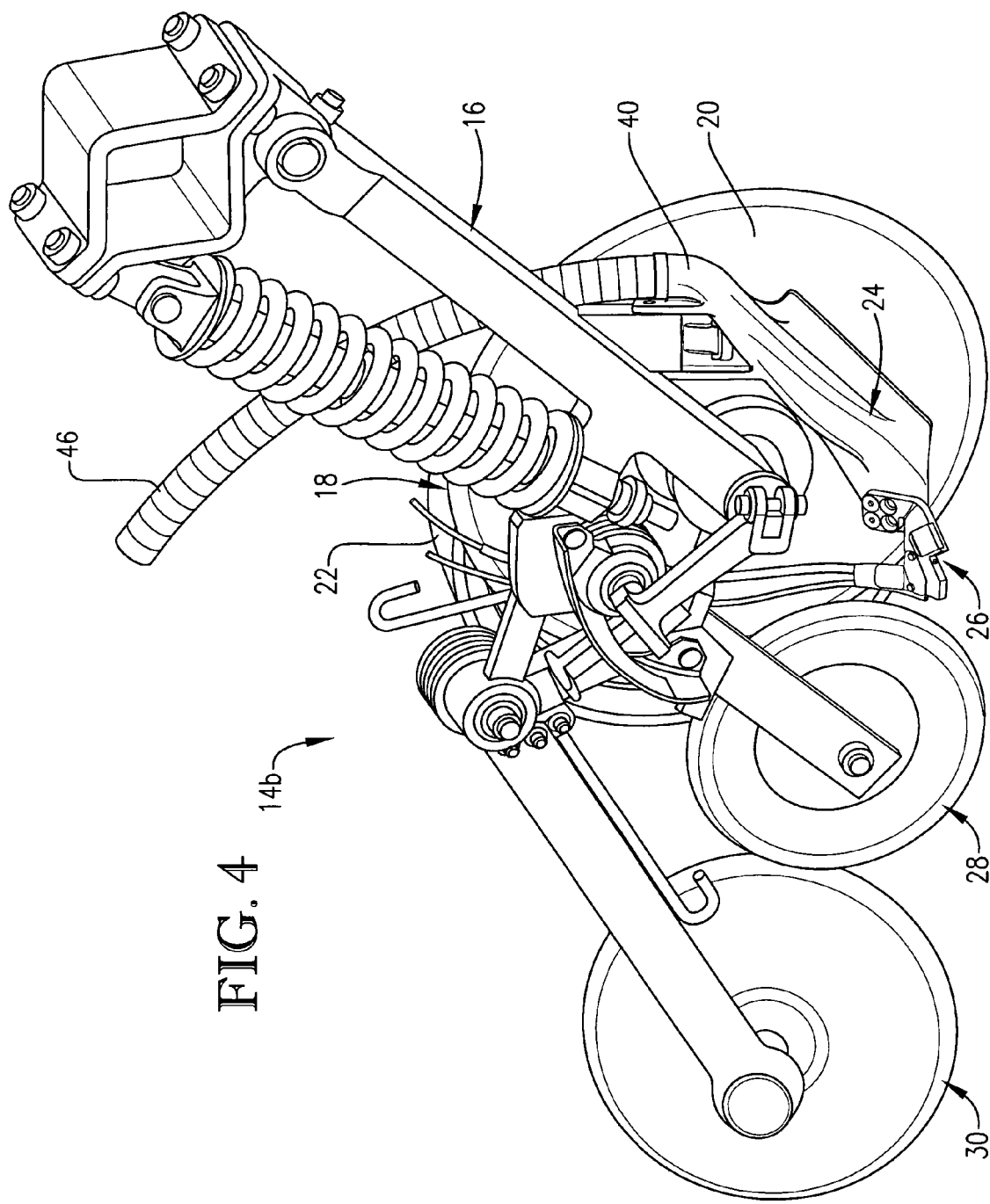
FIG. 4 is an enlarged perspective view of one of the left-handed disc openers illustrated in FIG. 1 removed from the tool bar of the air seeder.
Figure 11:
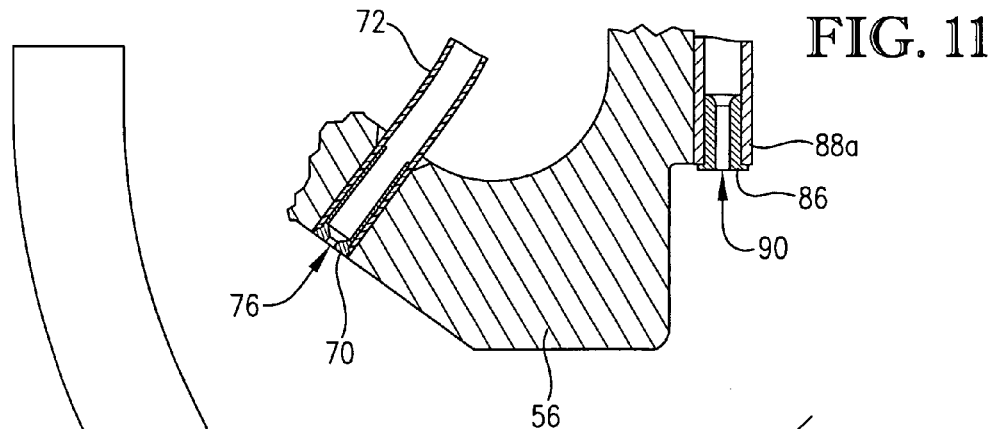
FIG. 11 is greatly enlarged fragmentary sectional view of the fertilizer injector wing illustrated in FIGS. 5–7 showing the toxic and non-toxic fertilizer injector nozzles.

The seed boot 24 is fixed relative to the disc 20, for example fixed to the drawbar 16, and preferably rides in the shadow SA of the disc 20 to prevent excessive wear of the boot 24. As shown in FIGS. 4–5, the seed boot 24 presents a lower-most margin 38 that is configured to engage the disturbed soil zone Z as the boot 24 is pulled there through to thereby form a seed bed BS in the furrow F (see FIGS. 8 and 9). The seed boot 24 defines a seed tube 40 presenting a terminal seed port 42. As the boot 24 is pulled in the forward direction, seed S is deposited along the seed bed BS (see FIGS. 8 and 9). The seed boot 24 is adjustably fixed relative to the disc 20 and can be adjusted between shallow, medium, and deep settings, as further described below. The illustrated seeder 10 is an air seeder and in this regard the seed tube 40 is in air communication with a seed tank 44 by a hose 46 (see FIGS. 1 and 4). However, the seed delivery could be alternatively configured, including metered delivery such as singulation or otherwise. Additionally, the seed boot 24 could be variously configured, such as including a seed deflector, and need not include, for example, the one-piece configuration as illustrated. Seed boot, as that term is used herein, refers to the seed delivery structure that forms the seed bed and deposits the seed therein in single disc openers and is not limited to any particular manufacturer's equipment, regardless of the terminology assigned to the delivery structure by the manufacturer. For example, the term seed boot includes the combination of a scraper and seed tube as disclosed in U.S. Pat. No. 6,386,127 assigned to Case Corporation and incorporated herein by reference. As described in detail below, the fertilizer injector wing 26 places fertilzers N and P adjacent the seed bed BS.

Once the seed S and has been deposited along the seed bed BS, the firming wheel 28 is pulled along the seed bed BS to firmly press the seed S into the top soil along the seed bed BS. After the seed S and fertilizers N and P have been properly placed in the furrow F, the closing wheel 30 is pulled adjacent the furrow F to thereby close the furrow F. As previously indicated, the illustrated opener 14b could be any conventional opener that is modified with the inventive fertilizer injector wing 26 as will be subsequently described in detail. Exemplary suitable openers for modification are the openers commercially available on the John Deere 1890 No-Till Air Drill. However, the utilized opener could be variously configured and could include more or less components in any suitable manner known in the art.

The inventive fertilizer injector wing 26, perhaps as best illustrated in FIGS. 4–8 and 11, is configured for fixed attachment to the seed boot 24 and when affixed thereto places fertilizer, including a toxic charge of fertilizer N, in close proximity with the seed row S at an optimal geometric position relative thereto without damaging the germination of the seed S or disrupting the seed bed BS. Particularly, the illustrated wing 26 includes a body 48, a toxic fertilizer injector 50, and a non-toxic fertilizer injector 52. In more detail, the illustrated body 48 includes an upper inline portion 54 and a lower outboard portion 56. The inline portion 54 is generally linearly extending with a flat, low profile and is configured to couple to the outboard, or trailing wall of the seed boot 24 by a pair of allen-type screws 58. The inline portion 54 preferably closely engages the side of the boot 24 and rides in the shadow of the seed boot 24. That is to say, the inline portion 54 preferably does not extend below the lower-most margin 38 of the boot 24 or stick out beyond the leading edge of the boot 24 when the opener 14b is pulled in the forward direction. In this manner, the inline portion 54 preferably is protected from engaging the soil and/or debris in the field G by the boot 24.

For purposes that will subsequently be described, the outboard portion 56 is configured to extend below the margin 38 of the boot 24 so as not to ride in the shadow of the seed boot 24. In this regard, the body 48 is configured to adjustably affix to the outside of the boot 24 and includes a pair of upper screw-receiving apertures 60 and a pair of lower screw-receiving apertures 62 formed in the inline portion 54. In this manner, the inline portion 54 can be affixed to the boot 24 in either a low position, corresponding to the screws 58 being in the upper apertures 60 (as shown in FIG. 5) or a high position, corresponding to the screws 58 being in the lower apertures 62, to thereby adjust the depth of the outboard portion 56 relative to the lower-most margin 38 of the boot 24. The illustrated body 48 enables the wing 26 to be attached to the seed boot 24 after factory manufacture to provide an easy field modification. However, the body 48 could be alternatively configured, for example, manufactured with the seed boot, such as with an integral, cast construction or the like. As will become apparent, whatever configuration is utilized preferably enables the body of the wing to be adjustable so that the depth of the outboard portion relative to the boot 24 can be adjusted in some manner.

The outboard portion 56 of the wing 26 presents a leading edge 64 that leads the outboard portion 56 as the wing 26 is pulled in the forward direction of travel. As previously indicated, the outboard portion 56 of the body 48 preferably extends below the margin 38 of the boot 24 and thus does not ride in the shadow of the boot 24. In this regard, as the opener 14b is pulled through the ground G, the leading edge 64 engages the soil (either in the disturbed soil zone Z within the furrow F and/or outside of the zone Z as further detailed below) to thereby form a fertilizer bed BF, as shown in FIGS. 8 and 9. The illustrated outboard portion 56 is preferably about three-eighths inches thick and thus the fertilizer bed BF is also preferably about three-eighths inches wide. For purposes that will be further detailed below, the outboard portion 56 of the body 48 preferably angles outward from the inline portion 54 and thus the boot 24 (see FIGS. 7 and 8). In this regard, the outboard portion 56 preferably angles outward relative to the inline portion 54—and thus relative to vertical—between about five and thirty degrees and more preferably about fifteen degrees. In this manner, as the opener 14b is pulled through the ground G, the fertilizer bed BF is laterally spaced from the seed bed BS. The outboard configuration of the portion 56 and the angled configuration thereof cooperate to create a berm B, as shown in FIGS. 8 and 9, between the seed and fertilizer beds BS,BF. As will be further detailed below, the berm B functions to desirably isolate the seed and fertilizer beds BS,BF.

Because the outboard portion 56 engages the soil to form the fertilizer bed BF, it will be appreciated that the portion 56 is subject to heavy wear. Accordingly, the body 48 is preferably formed from a strong, durable material such as steel or other iron alloys. Additionally, the illustrated outboard portion 56 is configured to resist and/or reduce the affects of wear. In this regard, the illustrated wing 26 presents a low profile, with lower and upper cutout sections 66a and 66b and includes a carbide insert 68 positioned along the leading edge 64 to strengthen the portion 56.

Once the fertilizer injector wing 26 forms the fertilizer bed BF, the wing 26 is configured to inject the fertilizers N and P into the bed BF. Particularly, the toxic fertilizer injector 50 is configured to inject the toxic fertilizer N into the fertilizer bed BF and the non-toxic fertilizer injector 52 is configured to inject the non-toxic fertilizer P into the bed BF. In more detail, the toxic fertilizer injector 50 includes a nozzle 70, a supply line 72, and a protective sheath 74 (see FIGS. 5–7 and 11). As further detailed below, the preferred toxic fertilizer N is anhydrous ammonia placed in the BF in liquid form. In this regard, the illustrated nozzle 70 includes a terminal orifice 76 that is configured to inject liquid anhydrous ammonia. That is to say, the orifice 76 alters or maintains the pressure of the fertilizer N below and/or above the vapor pressure of the fertilizer N. One such suitable nozzle with the requisite terminal orifice is disclosed in U.S. Pat. No. 6,360,681 (the "Swanson '681 patent") and U.S. Pat. No. 6,283,049 (the "Swanson '049 patent"), both issued to the inventor of the current application and both incorporated herein by reference. In the illustrated wing 26, the outboard portion 56 is bored out adjacent the lower cutout 66a to receive the nozzle 70. In this manner, the nozzle 70 is recessed relative to the leading edge 64 of the wing 26 to facilitate the prevention of the terminal orifice 76 from becoming clogged with soil and/or debris in the field G.

As previously indicated, the toxic fertilizer injector 50 injects the toxic fertilizer N, preferably anhydrous ammonia, into the fertilizer bed BF. In this regard, the supply line 72 fluidly communicates the nozzle 70 with a fertilizer tank 78 stored on the cart 12. In one manner known in the art, the illustrated tank 78 stores a quantity of anhydrous ammonia N (either gas or liquid) and delivers it through a manifold 80 disposed along the supply line 72 under a controlled pressure to the nozzle 70 where it is injected as liquid anhydrous ammonia N into the fertilizer bed BF. The Swanson '681 and '049 patents previously incorporated by reference disclose a suitable anhydrous ammonia delivery system including a manifold. The supply line 72 is preferably a nylon-type line that facilitates assembly of the nozzle 70 into the line 72 within the bored opening in the outboard portion 56. Because the nylon line 72 is susceptible to damage from debris in the field G, such as stalks and stubble, the illustrated wing 26 includes the metal sheath 74, as well as a stock shield 82 bolted over the leading side of the upper cutout 66b (see FIGS. 5 and 6). The protective sheath 74 also functions to keep the line 72 out of the working components of the opener 14b. Additionally, in the illustrated wing 26, the sheath facilitates anchoring the line 72 to prevent unwanted movement of the line 72. In this regard, the sheath 74 is coupled to the body 48 by a hose mount portion 84 (see FIGS. 5 and 6), such as by welding or the like.

The non-toxic fertilizer injector 52, similar to the previously described injector 50, includes a nozzle 86 and a supply line 88 (see FIGS. 5–7). The illustrated injector 52 is preferably configured to inject liquid ammoniated phosphate, for example 10-34-O, into the ground G. In this regard, in one manner known in the art, the nozzle 86 includes a terminal orifice 90 configured to inject liquid ammoniated phosphate under pressure. The terminal orifice 90 presents a larger cross-sectional area than the previously described anhydrous ammonia injector orifice 76 to accommodate the different pressure requirements of the fertilizers N and P. In the illustrated wing 26, the nozzle 86 is positioned to trail the nozzle 70 and be inline therewith so as to place the fertilizers N and P in a single, dedicated fertilizer band DB (see FIG. 3). When the fertilizers N and P comprise anhydrous ammonia and ammoniated phosphate, respectively, the double shot single band application facilitates the desirable formation of the highly plant available tri-ammonium phosphate in the soil. The nozzle 86 is also preferably recessed from the leading and lower edges of the outboard portion 56 of the wing 26 to prevent undesired clogging of the terminal orifice 90.

As previously indicated, the non-toxic fertilizer injector 52 injects the non-toxic fertilizer P, preferably ammoniated phosphate, into the fertilizer bed BF. In this regard, the supply line 88 fluidly communicates the nozzle 86 with a fertilizer tank 92 stored on the tractor T. In one manner known in the art, the illustrated tank 92 stores a quantity of ammoniated phosphate and delivers it through a manifold 94 disposed along the supply line 88 under a controlled pressure to the nozzle 86 where it is injected as liquid ammoniated phosphate P into the fertilizer bed BF. The illustrated supply line 88 includes a lower metal leader 88a that is connected to an upper synthetic line portion 88b by a valve 96 (see FIG. 7). The metal leader 88a prevents damage to the line 88 from stubble and field debris and facilitates keeping the line 88 from undesired movement into the operating components of the opener 14b. In this regard, the leader 88a is coupled to the hose mount 84 of the body 48 (see FIGS. 5 and 6).

Turning now to FIGS. 3, 8–9, and 10, the illustrated opener 14b with the unique fertilizer injector wing 26 is configured to place the seed row S and the dedicated fertilizer band DB at an optimum geometric positional alignment relative to the seed row S, in a single, low soil disturbing planting pass without disrupting the seed bed BS. That is to say, the inventive wing 26 enables a toxic charge TC (see FIGS. 9 and 10) of the fertilizer N,P—a charge containing the optimum nutrient package to sustain season long growth of the crop—to be placed sufficiently close to the seed S while minimizing soil disturbance so that weed growth and moisture loss are minimized and crop yield is maximized. While close placement of the dedicated band DB is highly desirable, the optimal placement of the band DB must be such that the germination of the seed S is not damaged by the toxic charge TC of fertilizer N,P. In this regard, it will be appreciated that some crops can sustain some nitrogen in the seed bed itself without damaging the germination, however, these nitrogen levels must be severely restricted. For example, with no-till farming, even the most heartiest of crops, such as cereal grains (e.g., wheat, barley, oat, etc.), cannot sustain more than thirty pounds of nitrogen per acre in the seed bed without germination damage. However, with no-till farming, most crops require substantially more placed nitrogen than the restricted levels that can be placed in the seed bed, for example, depending on the soil conditions, some cereal grains can require as much as two-hundred pounds of placed nitrogen per acre. Accordingly, the toxic charge TC of nitrogen, as that phrased is used herein refers to a charge of nitrogen that would cause germination damage if placed in the seed bed BS. It has been determined that the toxic charge TC of the fertilizer N,P can be placed much closer to the seed row S than heretofore conventionally thought acceptable before without the harmful affects of germination damage from seed burn.

In this regard, the fertilizer injector wing 26 enables the toxic charge TC of fertilizer N,P to be placed closely adjacent the seed bed BS, preferably laterally spaced therefrom and at or slightly below the seed bed BS. In more detail, the illustrated wing 26, with the angular oriented outboard portion 56, preferably places the toxic charge TC laterally spaced from the seed bed BS between at least about one-half inch to less than about two and one-half inches, and most preferably about one and one-half inches. That is to say, the berm B isolating the seed and fertilizer beds BS,BF is at least about one-half inches thick. However, in order to minimize soil disruption, and to a lesser extent to minimize equipment wear, the berm B is preferably no greater than about two and one-half inches thick. In this regard, at least a portion of the leading edge 64 of the outboard portion 56 of the wing 26 preferably engages the soil inside the disturbed soil zone Z (i.e., the entire body 48 riding in the shadow of the disc 20) or at least at the event horizon—i.e., the schism or demarcation between disturbed and undisturbed soil. It will be appreciated that the exact engagement of the edge 64 relative to the furrow F will vary depending on several factors, such as the depth setting of the disc 20, the depth setting of the boot 24, the depth setting of the wing 26, the topography of the terrain, the maneuvering of the seeder 10, and it is within the ambit of the present invention to draw the wing 26 entirely through either disturbed or undisturbed soil, or both. However, it is believed that the efficiency and effectiveness of the opener 14b is maximized if the leading edge 64 engages the soil inside the zone Z or least at the event horizon. As shown in FIGS. 8 and 9, the illustrated wing 26 cuts through the soil generally at the event horizon and therefore the fertilizer bed BF communicates with the disturbed soil zone Z of the furrow F at least partly below the surface of the ground G.

As previously indicated, the fertilizer bed BF is preferably vertically spaced from the surface of the ground G so that the bed BF is at or slightly below the seed bed BS. As shown in FIG. 10, in the illustrated opener 14b, the seed bed BS is vertically spaced from the surface of the ground G a seed bed dimension DBS and the fertilizer bed BF is vertically spaced from the seed bed BS a fertilizer bed dimension DBF. The dimension DBS is dependent on the depth setting of both the disc 20 and the boot 24 relative thereto and accordingly will vary as these depths are varied. However, a representative depth DBS is one-half to one inch, corresponding to a medium disc 20 depth of two to two and one-half inches and a medium boot 24 setting of one and one-half inches above bottom dead center of the disc 20. The dimension DBF only varies according to whether the body 48 is affixed to the boot 24 in the low or high position. A representative depth DBF is one-half inch in the high position and one inch in the low position. It will be appreciated that the use of firming wheel 28 could affect the spacing DBF by slightly lowering the depth DBS of the seed bed BS when firming the seed S into the soil.

As shown in FIG. 10, when the fertilizer N,P is placed in the ground G, it defines a burn dimension DB, typically greater than the sum of the depths DBS and DBF. The burn dimension DB is a product of the fertilizer N,P, particularly the toxic fertilizer N, burning into the soil. When anhydrous ammonia N is delivered in liquid form, it will burn into the ground creating a burn zone approximately one and one-half to two inches deep below the fertilizer bed BF. Accordingly, a representative DB is between three and four inches beneath the surface of the ground G. The angled configuration of the outboard portion 56 of the wing 26 enables the fertilizer bed BF to be placed in close proximity to the seed bed BS and at or slightly there below without enabling the burn zone to damage the germination of the seed S. It is believed the preferred fifteen degrees angle of the outboard portion 56 is sufficient to prevent the burn zone from damaging the dedicated seed row S, or burning through to any adjacent seed rows.

In the manner described above, the unique fertilizer injector wing 26 fixedly attached to the seed boot 24, with the angled outboard portion 56, enables the dedicated fertilizer band DB containing the toxic charge TC to be placed at a consistent and maintained optimum geometric positional alignment relative to the seed row S, in a single, low soil disturbing planting pass without disrupting the seed bed BS. It is believed such optimum alignment maximizes the crop yield by enabling seminal hair roots to access the nutrients in a more timely manner as they are forming while also minimizing weed growth and moisture loss by minimizing soil disturbance. Additionally, the consistent and uniform relationship maintained between the boot 24 and the wing 26 ensures a constant and accurate placement of the dedicated fertilizer band DB that does not suffer from the misalignment problems—and attendant seed burn—associated with turning and hillside terrains experienced with the prior art banders, particularly, the midrow banders.

It is within the ambit of the present invention to utilize various alternative configurations for the fertilizer injector wing suitable for various fertilizer placement applications. For example, the leading edge could be configured as a cutting blade (e.g., beveled, etc.), or the body could be configured to keep bouncing seed out of the line of fertilizer injector (e.g., with a seed guard, etc.). The fertilizer injectors could be variously configured to inject virtually any type of fertilizer, or any combination thereof, for example, a single injector, three injectors, etc. Additionally, one or more injectors could be configured to deliver fertilizer in various forms, for example, gaseous, granulized fertilizer, control agents, nurse crop seeds, or the like. The wing could also be used for fertilizer applications wherein seed is not simultaneously placed therewith. However, for some aspects of the present invention, it is important that the wing include an angled outboard portion forming a fertilizer bed and be affixed to the seed boot. Additionally, it is important that the fertilizer bed be sufficiently spaced from any seed bed to enable a toxic charge of fertilizer to be placed therein. If a toxic charge of fertilizer is placed, it need not be anhydrous ammonia, but could be for example, aqua ammonia, liquified urea, Solution 32, Solution 28, etc. Additionally, if a second fertilizer is double shot, it need not be ammoniated phosphate, but could be any type of suitable fertilizer.

In operation, the fertilizer injector wings are affixed to the seed boots and the openers 14 are set to the desired depth. The seeder 10 is then pulled through the field F in the forward direction. As the seeder 10 is pulled through the field F, the discs open the furrows F. The seed boots then form the seed beds BS in the disturbed soil zone Z and deposit the seed S therein. At the same time, the wings form the fertilizer beds BF, spaced from the seed beds by berms B, and inject toxic charges TC of fertilizer N,P as dedicated bands DB into the beds BF. The firming wheels then firm the seeds S into the soil and then the closing wheels close the furrows F.

As previously indicated, the fertilizer injector wing of the present invention could be alternatively configured. One suitable alternative is the fertilizer injector wing 200 illustrated in FIG. 12. The fertilizer injector wing 200 is similar in many respects to the previously described wing 26 and is thus configured for fixed attachment to a seed boot of a disc opener. However, unlike the wing 26, the wing 200 includes a seed guard 202. The seed guard 202 is a plate-like structure affixed to the body of the wing 200 in any suitable manner and configured to prevent bouncing seed from entering the fertilizer bed or engaging the fertilizer being injected by the wing 200. The guard 202 is particularly well suited for hillside operation. Additionally, the wing 200 includes a control agent delivery tube 204. The tube 204 is configured to deliver a granulized agent A into the fertilizer bed. For example, the agent A could include mustard meal for controlling insects, or various other biological control agents. Additionally, the agent A could comprise seed for a nurse crop planted along side the primary crop. However, if a nurse crop seed is being deposited, it is preferably done with a charge of fertilizer that is non-toxic to the nurse crop seed or done on a pass without fertilizer.

As previously indicated, the fertilizer injector wing could be alternatively configured; however it is important that whatever configuration is utilized provides sufficient geometric positional spacing between the seed bed and the fertilizer band to enable a toxic charge of fertilizer to be simultaneously placed with the seed in a single pass. One suitable alternative is the fertilizer injector wing 300 illustrated in FIGS. 13 and 14 with a disc 302 and a seed boot 304 of a suitable disc opener. The disc 302 and seed boot 304 are virtually identically configured as the disc 20 and the seed boot 24 of the disc opener 14b described in detail above. However, the fertilizer injector wing 300 includes some differences from the previously described wing 26 and will be described primarily with regard to these differences.

Similar to the previously described wing 26, the illustrated wing 300 includes a body 306, a toxic fertilizer injector 308, and a non-toxic fertilizer injector 310. However, unlike the wing 26, the illustrated wing 300 does not utilize the body 306 to create a fertilizer bed and isolate that bed from the seed bed. In the wing 300, this geometric spacing of the seed bed and the fertilizer band is accomplished with the angle of, and the force of, the delivery of the fertilizer out of the injectors 308, 310. Accordingly, there are some differences in the body 306 and injectors 308, 310 relative to the body 48 and injectors 50 and 52 detailed above. In more detail, the illustrated body 306, similar to the previously described body 48, bolts on to the outboard wall of the seed boot 304. The illustrated body 306 is generally flat and low profile so as to reduce its engagement with field debris during use. Unlike the body 48 detailed above, the illustrated body 306 does not extend below the lower-most margin of the seed boot 304 and thus the entire body 306 preferably rides in the shadow of the seed boot 304. The illustrated body 306, like the body 48, is configured to adjustably affix to the seed boot 304. In this manner, the body 306 can be positioned on the boot 304 so that the entire body 306 is positioned at or above the lower-most margin of the seed boot 304. In this regard, the body 306 preferably does not engage the soil, disturbed or otherwise, and thus does not form a fertilizer bed therein. However, the body 306 may still be subject to wear—for example, from engaging field debris, such as stubble, rocks, and the like—and therefore includes carbide inserts 312 and 314 to strengthen the body 306 and protect the injectors 308, 310. For purposes that will subsequently be described, the illustrated body 306 includes chambers, or cutouts, 316 and 318 configured to receive portions of the injectors 308, and 310. Additionally, as will be further detailed below, the illustrated body 306 includes a pair of nozzle-receiving collars 320 and 322, as well as a line-receiving collar 324.

Similar to the injector 50 detailed above, the illustrated toxic fertilizer injector 308 is configured to inject the toxic fertilizer N and includes a nozzle 326, a supply line 328, and a protective sheath 330. However, unlike the injector 50, the injector 308 injects the toxic fertilizer N into, or adjacent to, the furrow F rather than into a fertilizer bed. The preferred toxic fertilizer is anhydrous ammonia placed in or near the furrow F in liquid form. In this regard, the illustrated nozzle 326 includes a terminal orifice 332 that is configured to inject liquid anhydrous ammonia. For purposes that will subsequently be described, the terminal orifice 332 is preferably configured for high pressure delivery, such as less than about 0.05 ounces of liquid fertilizer per minute, and more preferably about 0.035 ounces per minute. In this manner, the nozzle 326 is configured to pressurize the toxic fertilizer N up to as much as about three-hundred psi above the pressure of the fertilizer N in the tank 78 and inject the liquid fertilizer N into, or adjacent, the furrow F at about one-hundred and eighty mph. In this manner, a fertilizer band 334 (see FIG. 14) is implanted in or near the furrow F where it "burns" into the soil. Suitable nozzles and fertilizer delivery systems are disclosed in the previously incorporated Swanson '681 and '049 patents. The nozzle 326 is received in the collar 322 so that the terminal orifice 332 is recessed relative to the lower-most margin of the seed boot 304.

As indicated above, in the wing 300, the geometric spacing of the seed bed and the toxic fertilizer band is accomplished with the angle of, and the force of, the delivery of the fertilizer out of the injector 308. In more detail, the nozzle 326 is positioned in the collar 322 so that the terminal orifice 332 defines a fertilizer injection axis AF (illustrated in FIG. 14), and injects the liquid fertilizer N coaxially along the injection axis AF. The seed boot 304 includes a seed outlet 336 through which the seed S is discharged in the seed bed BS. The seed outlet 336 defines an outlet axis AO (illustrated in FIG. 14) extending generally parallel to the direction the seed S is discharged. The wing 300 is configured so that the fertilizer injection axis AF is offset from the seed outlet axis AO by an offset angle OA (illustrated in FIG. 14). This offset angle OA, cooperates with the high rate of delivery of the liquid fertilizer N to geometrically space the fertilizer band 334 from the seed bed BS at a safe positional distance so that the toxic charge of fertilizer can be simultaneously placed with the seed S. In this regard, the offset angle OA is preferably between about five and about thirty degrees, more preferably between about ten and about twenty degrees, and most preferably about fifteen degrees.

The non-toxic fertilizer injector 310 is similarly configured to the toxic fertilizer injector 308 just described, but like the injector 52 detailed above, is configured to inject non-toxic fertilizer P, such as liquid ammoniated phosphate, in a double shot single band application with the toxic fertilizer N. Unlike the wing 26 detailed above, the illustrated wing 300 places the non-toxic fertilizer P in front of the toxic fertilizer N. In this regard, the toxic fertilizer injector 308 is positioned in a trailing relationship to the non-toxic fertilizer injector 310. It has been determined that when anhydrous ammonia is placed with ammoniated phosphate in this manner, crystals of tri-ammonium polyphosphate sulfate are formed in, or near the furrow F. It is believed this crystalline form is the most usable by the plant; however, it is not commercially available and cannot be premixed, for example in the tank 78, because the supply line would freeze during delivery of the crystals there through.

Another suitable alternative is the fertilizer injector wing 400 illustrated in FIGS. 15 and 16 with a disc 402 and a seed boot 404 of a suitable disc opener. In one manner known in the art, the seed boot 404 includes the combination of a scraper 406 and a seed tube 408 having a seed guard 410. On suitable such seed boot is disclosed in the previously incorporated Case '127 patent. The illustrated wing 400 is similar in many respects to the wing 300 detailed above and includes a body 412, a toxic fertilizer injector 414, and a non-toxic fertilizer injector 416. However, unlike the body 306, the body 412 is permanently affixed—such as by a weldment, or integrally formed therewith, or the like—to the trailing edge of the scraper 406 so that at least a portion of the seed tube 408 is positioned between the wing 400 and the disc 402. The body 412 includes carbide inserts 418, 420, and 422, with the insert 420 extending adjacent the lower-most margin of the scraper 406. Additionally, the body 412 includes a bracket 424 for securing the sheaths 426 and 428 of the injectors 414, 416, respectively, to the body 412. In the illustrated wing 400, the sheath 428 is also affixed to the body 412, such as by weldment or the like. Similar to the injectors 308 and 310 detailed above, the toxic injector 414 is in a trailing relationship with the non-toxic injector 416 and are configured to form an offset angle OA between the fertilizer injector axis AF and the seed outlet axis AO, as illustrated in FIG. 16.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:
1. A furrow opener comprising:
a rotatable disc operable to be pulled over ground in a forward direction to thereby open a furrow therein;
a seed boot fixed relative to one side of the disc and being operable to insert seed in the furrow,
said seed boot presenting an outboard side distally spaced from the disc,
said seed boot including a seed outlet operable to discharge seed into the furrow,
said seed outlet defining an outlet axis extending generally parallel to the direction seed is discharged; and
a fertilizer injector wing fixed to the seed boot,
said fertilizer injector wing being positioned adjacent said outboard side of the seed boot so that at least a portion of said seed boot is positioned between the disc and wing,
said fertilizer injector wing including at least one nozzle operable to inject fertilizer into the furrow,
said at least one nozzle defining an injection axis extending generally parallel to the direction fertilizer is injected,
said injection axis extending nonparallel relative to said outlet axis so as to define an offset angle therebetween,
said offset angle being between about five and about thirty degrees.

2. The opener as claimed in claim 1,
said outlet axis being generally vertical relative to the ground.

3. The opener as claimed in claim 2,
said offset angle being at least about ten degrees.

4. The opener as claimed in claim 1,
said seed boot presenting a lower-most margin disposed in the furrow when inserting seed therein,
said seed boot including a seed tube defining an aft-most seed port through which seed passes when the seed boot is inserting seed into the furrow,
said seed port presenting an outer-most extremity distally spaced from the disc.

5. The opener as claimed in claim 4,
said fertilizer injector wing including at least one terminal orifice through which fertilizer passes when the wing is injecting fertilizer into the furrow,
said terminal orifice being spaced at or above the lower-most margin and laterally spaced from said outer-most extremity.

6. The opener as claimed in claim 1,
said nozzle including at least one terminal orifice through which fertilizer passes when the wing is injecting fertilizer into the furrow; and
a source of gaseous ammoniacal fertilizer;
a delivery system fluidly communicating said source with said nozzle,
said delivery system cooperating with said nozzle to pressurize the gaseous ammoniacal fertilizer at least below the vapor pressure of the ammoniacal fertilizer so that the terminal orifice injects liquid fertilizer into the furrow.

7. The opener as claimed in claim 6,
said delivery system being configured to inject a toxic charge of ammoniacal fertilizer through the injector wing.

8. The opener as claimed in claim 6,
said ammoniacal fertilizer comprising anhydrous ammonia.

9. The opener as claimed in claim 8,
said delivery system being configured to deliver more than thirty pounds of anhydrous ammonia per acre.

10. The opener as claimed in claim 1,
said fertilizer injector wing including a housing fixed relative to said outboard side of said seed boot.

11. The opener as claimed in claim 10,
said seed boot including a seed tube in a trailing relationship relative to said outboard side of said seed boot,
said housing being welded relative to said outboard side of said seed boot so that said seed tube is positioned between said housing and said disc.

12. The opener as claimed in claim 10,
said housing including a line-receiving chamber operable to receive a fertilizer-delivery line,
said housing presenting a generally linear axis of orientation,
said axis being generally vertical relative to the ground.

13. The opener as claimed in claim 12,
said nozzle including at least a portion of a fertilizer-delivery line,
said at least a portion of the fertilizer-delivery line being received within the line-receiving chamber,
said at least a portion of the fertilizer-delivery line presenting a generally longitudinal center axis,
said center axis being said injection axis.

14. The opener as claimed in claim 1,
said fertilizer injector wing including an additional nozzle operable to inject fertilizer into the furrow,
said first-mentioned nozzle being configured to inject ammoniacal fertilizer into the furrow,
said additional nozzle being configured to inject phosphate fertilizer into the furrow.

15. The opener as claimed in claim 14,
said first-mentioned nozzle being positioned in a trailing relationship relative to said additional nozzle.

16. The furrow opener as claimed in claim 1,
said disc being the only tillage tool of the furrow opener,
said fertilizer injector wing being configured to be entirely spaced from the furrow when the disc is pulled over ground.

17. A method of simultaneously applying a toxic charge of ammoniacal fertilizer in proximity with seed, said method comprising the steps of:
(a) fixing a seed boot relative to a rotatable disc and positioning the boot on one side thereof;
(b) fixing a fertilizer injector wing to said seed boot and laterally spacing the wing from the boot so that the seed boot is positioned between said disc and wing;
(c) pulling the disc through the soil to thereby open an elongated furrow wherein said disc creates a zone of disturbed soil in the furrow;
(d) pulling the seed boot and injector wing through the furrow to form a seed bed within the disturbed soil zone;
(e) dropping seed along a seed-placement axis into the seed bed; and
(f) simultaneously injecting ammoniacal fertilizer along an injection axis into the furrow outside of the seed bed, wherein the seed-placement and injection axes are offset by an offset angle of between about five and about thirty degrees.

18. The method as claimed in claim 17,
steps (c), (d), (e), and (I) being performed generally simultaneously.

19. The method as claimed in claim 17,
step (d) including the step of pulling the seed boot and at least a portion of the wing in the shadow of the rotating disc.

20. The method as claimed in claim 17,
said ammoniacal fertilizer comprising anhydrous ammonia.

21. The method as claimed in claim 20,
step (f) including the steps of condensing the anhydrous ammonia into a liquid and injecting the liquid into the soil at about one-hundred and eighty miles per hour.

22. The method as claimed in claim 20,
step (f) including the steps of simultaneously injecting a phosphate fertilizer into the furrow ahead of the ammoniacal fertilizer to form triammonium polyphosphate sulfate crystals in the furrow.

23. The method as claimed in claim 17,
steps (c)–(f) being performed such that the disc is the only tillage tool pulled through the soil.

24. The method as claimed in claim 23,
during steps (c)–(f) maintaining the fertilizer injector wing in a position spaced above the soil.

25. A fertilizer injector wing for use with a furrow opener wherein the furrow opener includes a single disc wherein the disc is the only tillage tool of the furrow opener and rotates in a forward direction over ground to open a furrow of disturbed soil therein, and a seed boot that forms a seed bed in the furrow and inserts seed therein, said injector wing comprising:
- a housing operable to engage the seed boot; and
- a nozzle supported on the housing and being configured to inject a toxic charge of ammoniacal fertilizer into the furrow,
- said housing including an inline portion operable to engage the seed boot and presenting a generally linear axis of orientation,
- said nozzle including a terminal orifice through which fertilizer is injected into the furrow,
- said nozzle defining an injection axis extending generally parallel to the direction fertilizer is injected,
- said injection axis extending nonparallel relative to the linear axis of orientation so as to define an offset angle between said injection axis and said linear axis of orientation,
- said offset angle being between about five and about thirty degrees,
- said injector wing being configured to be entirely spaced from the disturbed soil when the housing engages the seed boot.

26. The wing as claimed in claim 25; and
- a second terminal orifice in a linearly aligned leading relationship with the first mentioned terminal orifice and being configured to inject a second fertilizer into the furrow.

27. The wing as claimed in claim 26,
- said first mentioned terminal orifice defining a first cross-sectional area and said second terminal orifice defining a second cross-sectional area,
- said first area being substantially smaller than said second area so that ammoniacal fertilizer passing through the first terminal orifice is substantially more pressurized than fertilizer passing through said second terminal orifice.

28. The wing as claimed in claim 25,
- said terminal orifice being configured to pressurize the ammoniacal fertilizer at least below the vapor pressure of the ammoniacal fertilizer so that the injector wing is operable to inject liquid ammoniacal fertilizer into the furrow.

29. The wing as claimed in claim 25,
said offset angle being at least about ten degrees.

30. The wing as claimed in claim 29,
said offset angle being about twenty-five degrees.

31. The fertilizer injector wing as claimed in claim 25,
said axis of orientation being generally parallel to vertical relative to the ground when the inline portion engages the seed boot.

32. A furrow opener comprising:
- a rotatable disc operable to be pulled over ground in a forward direction to thereby open a furrow of disturbed soil therein,
- said disc being the only tillage tool of the furrow opener;
- a seed boot fixed relative to one side of the disc and being operable to insert seed in the furrow,
- said seed boot including a seed outlet operable to discharge seed into the furrow,
- said seed outlet defining an outlet axis extending generally parallel to the direction seed is discharged; and
- a fertilizer injector wing fixed to the seed boot,
- said fertilizer injector wing including at least one nozzle operable to inject a toxic charge of ammoniacal fertilizer into the furrow,
- said at least one nozzle defining an injection axis extending generally parallel to the direction fertilizer is injected,
- said outlet axis being configured to intersect the ground at a first point of intersection,
- said injection axis being configured to intersect the ground at a second point of intersection,
- said first and second points of intersection being laterally spaced from one another by a positional distance when the disc is pulled in the forward direction,
- said positional distance being at least about one-half inch and not greater than about two and one-half inches,
- said fertilizer injector wing being configured to be entirely spaced from the disturbed soil when the disc is pulled over ground.

33. The furrow opener as claimed in claim 32,
said positional distance being about one and one-half inches.

34. The furrow opener as claimed in claim 32,
said injection axis extending nonparallel relative to said outlet axis so as to define an offset angle therebetween,
said offset angle being between about five and about thirty degrees.

35. The furrow opener as claimed in claim 34,
said offset angle being about fifteen degrees.

* * * * *